US008935095B2

(12) United States Patent
Hartman et al.

(10) Patent No.: US 8,935,095 B2
(45) Date of Patent: Jan. 13, 2015

(54) SAFETY SYSTEM AND DEVICE AND METHODS OF OPERATING

(75) Inventors: Michael James Hartman, Clifton Park, NY (US); John E. Hershey, Ballston Lake, NY (US); Robert J. Mitchell, Jr., Waterford, NY (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1222 days.

(21) Appl. No.: 12/560,713

(22) Filed: Sep. 16, 2009

(65) Prior Publication Data

US 2011/0066374 A1 Mar. 17, 2011

(51) Int. Cl.
G01C 21/00 (2006.01)
G01C 21/20 (2006.01)
G01C 21/10 (2006.01)
G01C 23/00 (2006.01)

(52) U.S. Cl.
CPC ............... *G01C 21/20* (2013.01); *G01C 21/10* (2013.01); *G01C 23/00* (2013.01)
USPC .... 701/533; 701/420; 340/146.2; 340/286.14

(58) Field of Classification Search
CPC ......... G01C 21/00; G01C 21/10; G01C 23/00
USPC .............. 701/410, 533, 420, 300; 348/211.3; 463/42; 709/219; 726/27, 3; 707/10; 340/905, 146.2, 286.14; 235/375
See application file for complete search history.

(56) References Cited

U.S. PATENT DOCUMENTS

| 5,572,192 | A | 11/1996 | Berube |
| 6,046,689 | A | 4/2000 | Newman |
| 6,292,743 | B1 * | 9/2001 | Pu et al. ................... 701/423 |
| 6,636,803 | B1 | 10/2003 | Hartz, Jr. et al. |
| 6,691,028 | B2 * | 2/2004 | Bullock et al. ............. 701/420 |
| 6,781,523 | B2 * | 8/2004 | Matsui et al. ............. 340/910 |
| 7,035,650 | B1 * | 4/2006 | Moskowitz et al. ....... 455/456.5 |
| 7,259,656 | B1 * | 8/2007 | Wright ................... 340/286.14 |
| 7,289,023 | B2 | 10/2007 | Schneider et al. |
| 7,345,577 | B2 | 3/2008 | O'Flaherty et al. |
| 7,379,811 | B2 * | 5/2008 | Rasmussen et al. ......... 701/532 |
| 7,433,889 | B1 * | 10/2008 | Barton ........................ 1/1 |
| 7,657,367 | B1 * | 2/2010 | Phuyal et al. ............... 701/117 |
| 7,706,967 | B2 * | 4/2010 | Knockeart et al. ........... 701/119 |
| 7,898,432 | B2 * | 3/2011 | McNew et al. ............. 340/916 |
| 8,185,618 | B2 * | 5/2012 | Beliles et al. ............. 709/224 |
| 8,200,184 | B2 * | 6/2012 | Hamada et al. ........... 455/404.1 |
| 8,543,323 | B1 * | 9/2013 | Gold et al. ................. 701/411 |
| 8,725,406 | B2 * | 5/2014 | Kitajima .................... 701/408 |

(Continued)

FOREIGN PATENT DOCUMENTS

EP 1762964 A1 3/2003
WO 2005119539 A1 12/2005

*Primary Examiner* — Tuan C. To
(74) *Attorney, Agent, or Firm* — Cantor Colburn LLP (57) ABSTRACT

Various embodiments of a device, system and methods that promote safety and security within an organization. Sensor data from one or more installation sensors is collected, analyzed and used to create a map and/or directions that, when received by a wireless mobile device, facilitate a person's possible egress around or from a detected event. The information provided to the person by the map and/or the directions may be individually crafted to be of maximum use to the specific recipient so the person can understand, plan and execute the most appropriate danger avoidance maneuvers in minimal time.

19 Claims, 6 Drawing Sheets

(56) References Cited

U.S. PATENT DOCUMENTS

| | | | |
|---|---|---|---|
| 8,761,175 B2* | 6/2014 | Guha et al. | 370/392 |
| 8,798,918 B2* | 8/2014 | Onishi et al. | 701/420 |
| 2004/0119609 A1* | 6/2004 | Solomon | 340/928 |
| 2004/0222904 A1* | 11/2004 | Ciolli | 340/937 |
| 2005/0035863 A1 | 2/2005 | Nelson | |
| 2006/0059557 A1 | 3/2006 | Markham et al. | |
| 2010/0188503 A1* | 7/2010 | Tsai et al. | 348/142 |
| 2010/0293173 A1* | 11/2010 | Chapin et al. | 707/759 |
| 2010/0323657 A1* | 12/2010 | Barnard et al. | 455/404.1 |

* cited by examiner

SAFETY SYSTEM AND DEVICE AND METHODS OF OPERATING

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The field of the invention relates to safety systems generally, and more particularly to certain new and useful advances in emergency communications of which the following is a specification, reference being had to the drawings accompanying and forming a part of the same.

2. Description of Related Art

Promoting the safety of personnel in the workplace continues to be the chief responsibility and duty of an organization. Awareness of dangers within an environment is communicated in a variety of ways. One of these is by sound and light signaling an emergency and the need for personnel to move out of the endangered area at a deliberate and reasonable speed. However, in many instances the alarm annunciator advises only that there is a situation of concern but does not advise where the source of the danger is or a possible route to use for egress.

Additionally, most security and safety systems are centralized in nature, meaning that the decisions they make and the alarms they issue are located in one or a small plurality of fixed locations, usually within the boundaries of the installation. This localization makes it difficult for such systems to tailor emergency evacuation and/or security advisories to each person in or on the installation. Moreover, it is generally more difficult and ultimately more costly to improve or extend such systems to provide greater coverage as the installation expands and/or as the installation adds, modifies and/or removes specific services, devices and/or entire menus of options.

BRIEF SUMMARY OF THE INVENTION

Various embodiments of a method and system are disclosed that promote safety and security within an organization. Sensor data from one or more installation sensors is collected, analyzed and used to create a map and/or directions that, when received by a wireless mobile device, facilitate a person's possible egress around or from a detected event. The information provided to the person by the map and/or the directions may be individually crafted to be of maximum use to the specific recipient so the person can understand, plan and execute the most appropriate danger avoidance maneuvers in minimal time.

The system described herein is operative to provide individualized guidance to personnel within an installation in the event of an emergency, and also to permit ease of scaling the system. Using data received from one or more system sensors, the wireless mobile device not only provides environmental awareness, but also advises its user regarding safety and/or egress procedures.

Other features and advantages of the disclosure will become apparent by reference to the following description taken in connection with the accompanying drawings.

BRIEF DESCRIPTION OF THE SEVERAL VIEWS OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

A person working at or visiting an installation will carry a wireless mobile device that is operative to provide at least one of the following functions: display of sensors proximate the person's location on the installation together with data from those sensors, display of a map of the installation, or a portion thereof proximate the person's position, the map being oriented to the person's last known direction of movement, and/or visual and/or audio communication of directions that the person can use to understand, plan and execute a possible egress route. The possible egress route may avoid or minimize contact with a detected event. The wireless mobile device may be one of a wireless phone, a wireless personal digital assistant ("PDA"), or a special-purpose mobile security device ("MSD"). Examples of an installation include, but are not limited to: a building; a marine vessel (boat, ship, yacht, barge, etc.); a train; an aircraft; a spacecraft; a space station; the grounds, often including the buildings, of an educational institution, a business, a government site, an industrial site, etc. In short, as used herein, an installation is any monitored and mapped geographical area or man-made structure for which egress may be required in the event of an emergency. Examples of a portion of an installation proximate the person's position include, but are not limited to: a room, a corridor, a passage, a hallway, a building, a parking lot, a parking structure, a street, a path, and so forth.

First Function—Display of Sensors Surrounding a Person's Location

The first function provides a display of sensors monitoring areas proximate the person's position as he or she occupies and/or progresses through a particular area of an installation. The sensors that are displayed on the wireless mobile device may be fixed installation sensors that are linked with an installation system, such as a security system, a fire system, a mass notification system, and the like. The wireless mobile device may receive sensor data sent wirelessly from a central console, or may query installation sensors directly when allowed by policy.

Features of the first function comprise, by way of example and not limitation:

a visual display of one or more sensors in a proximate area ("spatial extent") surrounding the person's present position, and optionally—a visual and/or audible indication of sensor data for the one or more of the sensors;

a visual display of one or more sensors in an area proximate the person's scheduled egress route, and optionally—a visual and/or audible indication of sensor data for the one or more sensors; or a visual display of one or more sensors in an area proximate a path extrapolated from the person's most recent direction of movement, and optionally—a visual and/or audible indication of sensor data for the one or more of the sensors along the extrapolated path.

The sensor data for which the wireless mobile device provides a visual and/or audible indication can comprise, but is not limited, to an alarm, such as a fire alarm, a smoke alarm, a mass notification alarm, a door alarm, and so forth.

At least the sensor data for the display may be sent to the wireless mobile device via a wireless transmission from a central console equipped with a sensor streaming module that has access to the data from the one or more sensors that are proximate to the person's present position, possible egress route, or the path extrapolated from the person's most recent direction of movement. Map data for the display may also be sent to the wireless mobile device via wireless transmission from the central console or other network server. Alternatively, the map data for the display can be preloaded into a memory of the wireless mobile device.

In one embodiment, the map and/or sensor data is processed at the central console and formatted so that its spatial extent is appropriate for the person's position at the time of the person's receiving the map and/or sensor data. The spatial extent may also be adjustable by either the person or an operator of the central console.

The spatial extent on the wireless mobile device display may be oriented with respect to the person's most recent direction of motion or most recent orientation to provide a more natural and unambiguous spatial reference to the person as they evacuate the installation.

Second Function—Communication of Egress Route and/or Instructions

The second function provided by the wireless mobile device is the communication of an egress route and/or instructions that are based on a detected event, such as a fire or other emergency. This is accomplished in one embodiment by the display of a map, oriented to the person's position, together with a possible egress route or the person's determined direction of movement, on a display of the wireless mobile device, and/or by the device's display of written instructions, and/or by the device's playing of audible instructions. The written and/or audible instructions may help the person understand, plan and execute the egress route.

A computer processor in the central console (or panel) of the installation's security, fire and/or mass notification system may determine the person's position, most recent direction of movement, and/or most recent orientation in at least two ways:

the wireless mobile device contains one or more onboard accelerometers, position sensors, and the like that output the wireless mobile device's location, most recent direction of movement, and/or most recent orientation for wireless transmission to the central console; or alternatively, the wireless mobile device wirelessly transmits its present position, most recent direction of movement, and/or most recent orientation to the central console. This may be accomplished using, by way of example and not limitation: accelerometers, radio or audio-based location techniques, and/or by calculation based on sensor imagery provided to the central console whose processed outputs are formatted and/or overlaid with map data and/or sensor data, and then wirelessly sent from the central console to the wireless mobile device(s) for display.

Installation System

Figure 1:
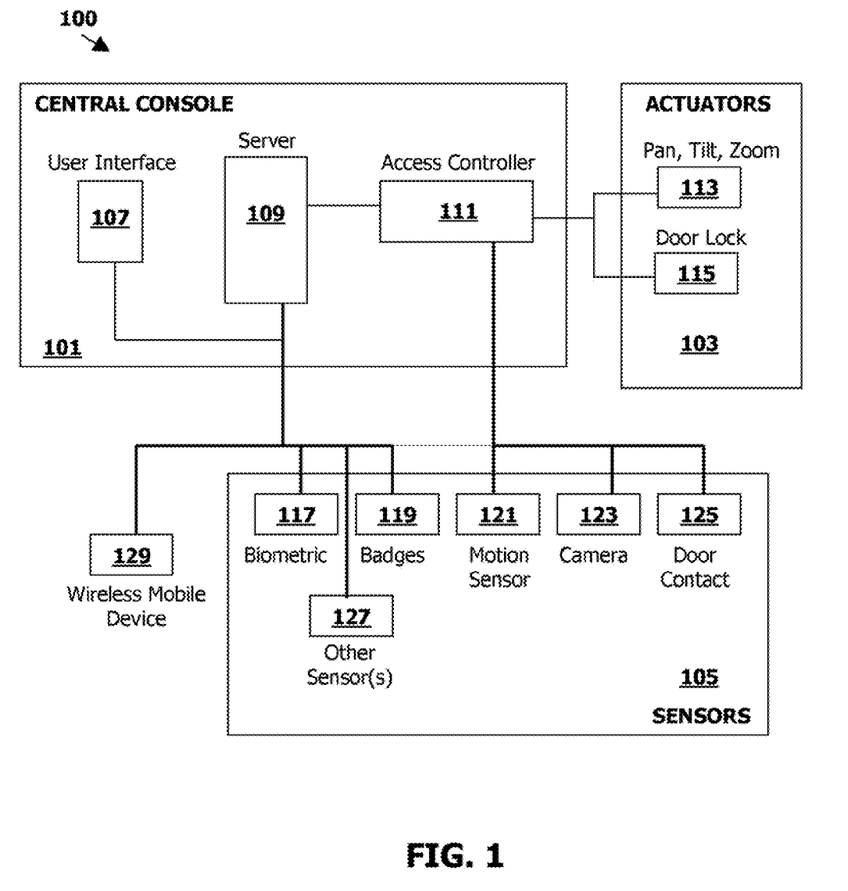
FIG. 1 is a diagram that illustrates an embodiment of a system having one or more deployed security and/or emergency detection sensors.

FIG. 1 is a diagram that illustrates an embodiment of an installation system ("system") 100 that is operative to provide information to one or more wireless mobile devices carried by a corresponding one or more persons in or on the installation. Examples of installation system 100 include, but are not limited to, a security system, a fire system, a mass notification system, and the like.

As mentioned above, the information that the system 100 provides is tailored to help each specific recipient understand, plan and execute the most appropriate danger avoidance maneuvers in minimal time, based on situational factor data. Examples of situational factor data include but are not limited to, (a) manually input data indicative of: and (b) received sensor data indicative of: the person's position in or on the installation, the type of emergency requiring instructions and/or evacuation, the proximity of the person's position to the location of an emergency event, location of one or more locked or inoperable exit points, location of blocked and/or hazardous passages, rooms, corridors, and/or hallways, and so forth. Examples of exit points that could be locked and/or inoperable during an emergency include, but are not limited to, doors, windows, skylights, access panels, hatches, etc. Situational factor data may further comprise retrieved instruction data, specific to the identified type of emergency and/or the specific recipient, that can be transmitted to the one or more wireless mobile devices for textual and/or graphical display and/or audio playback. An example of such instruction data is: "A fire has been detected on Level 5. Emergency personnel have been notified. Please exit this location now. A possible egress route is shown on the map." Another example of instruction data is an instruction that causes a visual, vibrational, and/or alarm to activate on the wireless notification device. For example, the display and/or power LED of the wireless notification device can flash in a predetermined color and/or at a predetermined frequency, the display can show an alert message and/or icon, and/or a speaker of the wireless mobile device can generate an audible tone or alarm, which is specific to emergencies generally and/or to one or more types of emergencies.

At a high-level, components of the system 100 comprise a central console (or panel) 101, which is wired or wirelessly coupled with: (a) one or more camera and/or door actuators 103, (b) one or more sensors 105, and (c) the wireless mobile device 129. The central console 101 is also wirelessly coupled with the wireless mobile device 129.

Each of the components comprises one or more sub-components. For example, the central console 101 comprises a user interface 107, a server 109, and an access controller 111. The user interface 107, which may be a keypad, a display and/or a computer mouse, is coupled with a server 109 and with one or more of the sensors 105. The one or more actuators 103 comprise a pan, tilt, and zoom actuator 113 for a security camera and one or more door locks 115. The one or more sensors 105 comprise biometric identification device(s) 117, employee badge reader(s) 119, motion sensor(s) 121, security camera(s) 123, door contacts 125, and (optionally) one or more other sensors 127. The one or more other sensors 127 may include, without limitation: fire sensors, smoke detectors, microphones, keypads, and so forth.

The access controller 111 is coupled with the one or more actuators 103 and with the one or more sensors 105. In particular, the access controller 111 is coupled with the pan, tilt, and zoom motors 113 of a camera, and with one or more door locks 115. The access controller 111 is also coupled with, and configured to control, sensors 105 such as: motion sensor(s) 121, security camera(s) 123, and/or door contact(s) 125. Optionally, the access controller 111 may be coupled with, and configured to control, the biometric identification device(s) 117, the employee badge reader(s) 119, and/or the one or more other sensors 127. The access controller uses logic and/or one or more algorithms to control movement and operation of one or more cameras and to control operation of the one or more door locks.

Sensor data output from each of the sensors 105 is sent to the central console 101 and stored in a database on the server 109 for later retrieval, processing, and/or transmission. Additionally or alternatively, each sensor stores sensor data in its memory, for later transmission to the database on the server 109 or for direct retrieval by the wireless mobile device 129. Examples of the sensor data output from each of the sensors 105 comprises, but is not limited to: when an event occurred, the type of event detected, and the sensor that made the detection. Simple sensors, such as the door contact(s) 125 or a fire/smoke detector output limited data, such as that a door is open/closed or that fire/smoke has been detected. More complex sensors, such as the security camera(s) 123 output more robust data that can be processed using known techniques to identify one or more of the following: a type of emergency event, the type of information (maps, egress routes, emergency instructions, etc.) to be transmitted to the one or more wireless mobile devices 129, the specific persons to be alerted, and so forth.

Wireless Mobile Device

Figure 2:
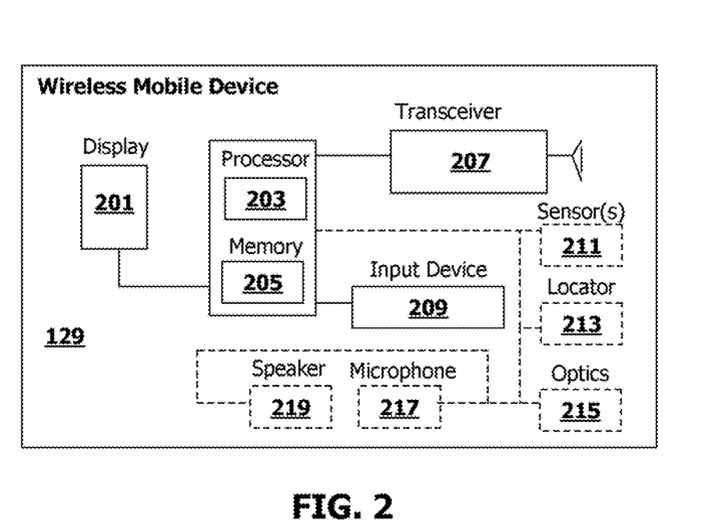
FIG. 2 is a diagram of an embodiment of a wireless mobile device.

FIG. 2 is a diagram of an embodiment of the one or more wireless mobile devices 129, shown in FIG. 1. Sub-components of each wireless mobile device 129 comprise, without limitation: a display 201, which is coupled with a suitable computer processor ("processor") 203 and configured to display map data together with sensor location data and/or sensor data that corresponds to one or more installation sensors 105 (in FIG. 1) in an area proximate: a wireless mobile device's (and/or a person's) position in or on the installation, the wireless mobile device's (and/or the person's) most recent direction of movement, and/or the wireless mobile device's (and/or the person's) most recent orientation. Examples of the display 201 include, but are not limited to: a liquid crystal display ("LCD"), a light emitting diode ("LED") display, an organic light emitting diode ("OLED") display, a plasma display, or any other type of display technology that is suitable for handheld computing applications.

The processor 203 is coupled with a memory 205 and configured to process the map data, sensor location data, situational factor data, sensor data and/or (optionally) orientation data for display on the display 201. The processor 203 is further configured to operate the transceiver 207 to send and receive encrypted wireless messages to and from the server 109 (FIG. 1) of the central security console 101 (FIG. 1)—or to and/or from the one or more sensors 105 (FIG. 1). The processor 203 is further configured to receive and process inputs from an input device 209, such as a keypad, a computer mouse, a touch screen, and so forth.

Optionally, the processor 203 may be configured to operate and/or process data received from one or more onboard sensors 211, a locator 213, optics 215, a microphone 217 and/or a speaker 219. Examples of the one or more onboard sensors 211 comprise, without limitation: a temperature sensor, a gas sensor, a temperature gradient sensor, a humidity sensor, and so forth. For use in outdoor portions of an installation, the locator 213 may be a global positioning system ("GPS") receiver. For indoor portions of an installation, the locator 213 is any device, or combination of devices, that outputs data, which the processor 203 and/or the server 109 (FIG. 1) can process to calculate the wireless mobile device's location, most recent direction of movement and/or most recent orientation.

In one embodiment, the locator 213 comprises an accelerometer. The processor 203 processes data output by the accelerometer together with triangulation data received in or from wireless signals, which are outputted by different, geographically separate sources and received by the transceiver 207, to calculate one or more of the position, most recent direction of motion, and/or most recent orientation of (a) a person, (b) a wireless mobile device or (c) a combination thereof. The optional optics 215 may comprise one or more of: a still camera, and a video camera. The optional microphone 217 is configured to receive voice commands from a user of the wireless mobile device 129, to receive and route voice data to the processor 203 for processing and/or wireless transmission, via the transceiver 207, to the server 109 (FIG. 1) of the central console 101 (FIG. 1), and/or to record ambient sounds during the person's evacuation, which can be used and/or processed to further assess a detected emergency event and/or to detect another emergency event. The optional speaker 219 is configured to play audible indications of sensor data (such as an indication of a fire alarm, smoke alarm, detection of a hazardous gas, etc.) and/or can be further configured to play voice data received from the central security console 101 (FIG. 1).

Examples of Operation

Figure 3:
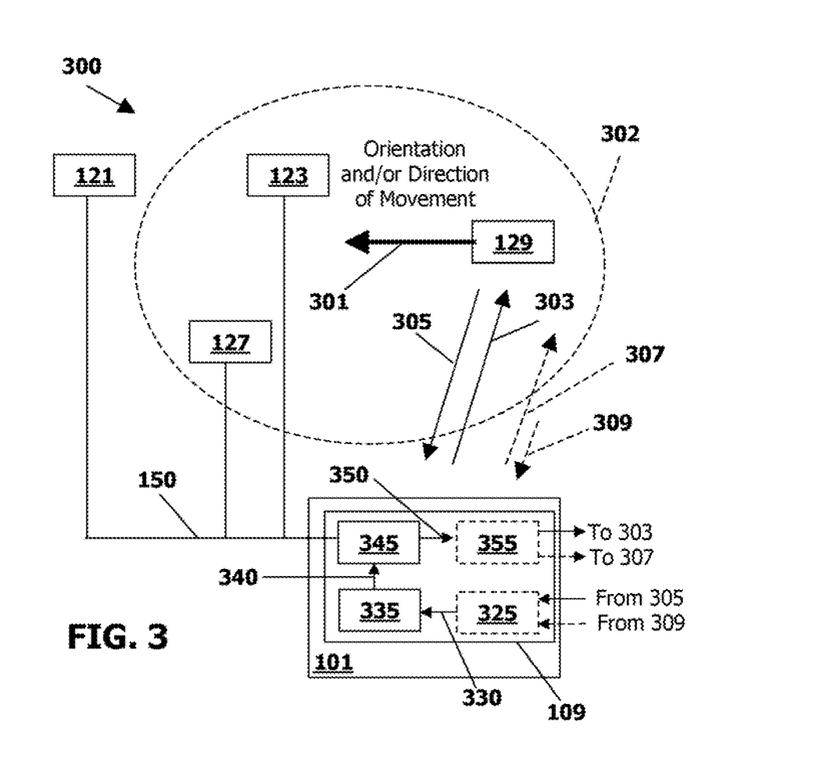
FIG. 3 is a diagram illustrating an embodiment of the system of FIG. 1 in which sensor location and/or sensor data is transmitted to the mobile device together with orientation data.

FIG. 3 is a diagram 300 illustrating an embodiment of the system of FIG. 1 in which situational factor data, map data and/or sensor location data is transmitted to the wireless mobile device 129 together with orientation data. As mentioned above, the map data illustrates the passageways, corridors, hallways, rooms, etc., and other important features such as exit points and their operational status, for an area of the installation proximate a position of the wireless mobile device 129. Referring to FIGS. 1, 2 and 3, for purposes of illustration only, the central console 101, comprising server 109, is wired or wirelessly coupled with one or more sensors, such as a motion sensor 121, a security camera 123, and one or more other sensors 127 (such as a fire detector and/or a smoke detector). The server 109 comprises a sensor-streaming module 345 and a sensor association module 335, and optionally comprises an encryptor/authenticator 355, which may be embodied as a hardware module or as a software routine, and a decryptor/authenticator 325, which may also be embodied as a hardware module or as a software routine.

The sensors 121, 123 and 127 are coupled with the sensor-streaming module 345, which distributes the sensor outputs 150 to the wireless mobile device 129 using a time-division protocol that assigns a time slot to each of the sensors 121, 123 and 127. Optionally, the sensor outputs 150 are encrypted by the encryptor/authenticator 355 prior to being transmitted to the wireless mobile device 129.

Transported by a person (not shown), the wireless mobile device 129 has a direction of movement and/or an orientation, represented by arrow 301, which in FIG. 3 points from the wireless mobile device 129 toward the sensors 121, 123 and 127. Surrounding the wireless mobile device 129 and overlapping at least the sensors 123 and 127 is a spatial extent 302. As used herein, the term "spatial extent" refers to an area proximate a person's location, most recent direction of movement, and/or most recent orientation.

The server 109 sends wireless messages 303 and/or 307 to the wireless mobile device 129, and receives wireless messages 305 and/or 309 from the wireless mobile device 129, over an encrypted wireless channel. In operation, the server 109 receives one or more first wireless messages 305 from the wireless mobile device 129, which comprise data indicative of, or which can be processed by the server 109 to calculate, the wireless mobile device's location, most recent direction of motion and/or most recent orientation. Thereafter, the server 109 transmits one or more second wireless messages 303 to the wireless mobile device 129, which comprise one or more of: map data, sensor location data, sensor data, situational factor data and/or orientation data. The sensor location data and/or sensor data is/are provided at least for the sensors 123 and 127 that are within, or overlapped by, the spatial extent 302. In order to transmit the one or more second wireless messages 303, the server 109 may compare at least the wireless mobile device position data and/or the wireless mobile device's most recent direction of motion data with one or more previously stored lookup tables that contain sensor location data. The wireless mobile device processor 203 (FIG. 2) processes the orientation data, which may be provided by the server 109 and/or the wireless mobile device 129, and outputs display data that orients and/or overlaps the map data, sensor location data and/or sensor data on the wireless mobile device display 201 (FIG. 2).

In an alternative embodiment, the server 109 calculates and transmits to the wireless mobile device 129, in one or more third wireless messages 307, one or more of wireless mobile device location data, the wireless mobile device's most recent direction of motion data, the wireless mobile device's most recent orientation data and sensor location data. Thereafter, the wireless mobile device processor 203 (FIG. 2) processes this data to output display data that orients and/or overlaps the map data and/or sensor location data on the wireless mobile device display 201 (FIG. 2). Thereafter, the processor 203 (FIG. 2) receives inputs from a user of the wireless mobile device 129 that select one or more of the displayed sensor locations. This inputted data is then processed and transmitted, via the wireless mobile device transceiver 107 (FIG. 2) to the server 109 in one or more fourth wireless messages 309. Thereafter, the server 109 retrieves and transmits sensor data back to the wireless mobile device 129 for the selected sensor locations.

On notification of an alert, or acting sua sponte, a user of the wireless mobile device 129 can gather situational factor data (including relevant sensor data of the sensors 123 and 127 within the spatial extent 302) and/or one or more of map data, sensor location data, and orientation data from the server 109. Additionally, upon notification of an alert, or acting sua sponte, the user can identify their position in or on the installation, using the wireless mobile device 129, an installation telephone, an installation computer, and so forth. Communications 305 and 307 from the wireless mobile device 129 can be optionally decrypted/authenticated by the decryptor/authenticator 325 before being presented 330 to the sensor association module 335. The sensor association module 335 is used by a processor of the server 109 to identify the sensors 121, 123 and 127 that are in proximity to, and/or within the spatial extent 302 of, a position of the wireless mobile device 102.

Alternatively, one or more of the sensors 123 and 127 proximate a position of the wireless mobile device 129 and/or within the spatial extent 302, wirelessly broadcast identification data, situational factor data, sensor data (and optionally, orientation data) to the wireless mobile device 129. The wireless mobile device 129 receives, demodulates, decodes and processes these various types of data to determine and output/display a possible egress route and/or to determine and output/display/playback textual, graphical and/or audio instructions that are specific to the user of the wireless mobile device 129 and to the type of emergency (or security) events detected by the installation sensors.

Optionally, the sensor association module 335 is a database table that is downloaded to and stored in a memory of the wireless mobile device 129. Alternatively, the sensor association module 335 is a database table that is stored both on the server 109 and in the memory of the wireless mobile device 129.

Sensor data is interpreted depending on the context in which it is to be used. One important case concerns sensor failure. If an installation sensor does not report, a special character (represented by a series of dashes) is used herein to represent the non-report.

A non-limiting example of the sensor association module 335 is shown in Table 1, which illustratively interprets data output from a door sensor in a fire emergency context and in a security context:

TABLE 1

Sensor Association Module

| Door Sensor Reporting? | Reported Message | Context = Emergency Assumption | Context = Security Assumption |
|---|---|---|---|
| NO | — | Assume Door is LOCKED | Assume Door is UNLOCKED |
| YES | Door Unlocked | Assume Door is Not LOCKED | Assume Door is UNLOCKED |
| YES | Door Locked | Assume Door is LOCKED | Assume Door is LOCKED |

For brevity, all other possible implementations of the sensor association module 335, are not shown here, but are contemplated as being within the scope of the appended claims.

Figure 4:
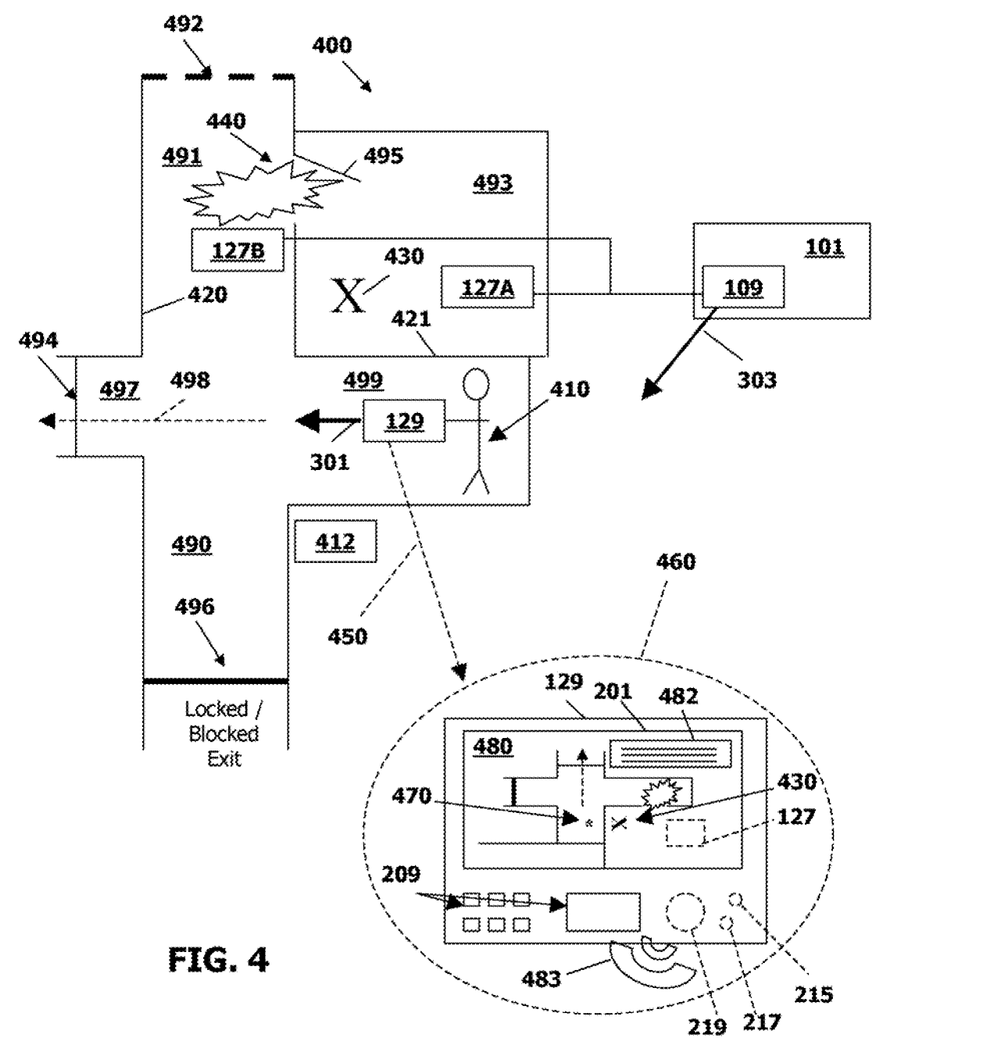
FIG. 4 is a diagram illustrating how an event detected by a sensor is displayed on the mobile device for viewing by a user and how an egress route is mapped based on the detected event.

FIG. 4 is a diagram 400 illustrating how an event 430 detected by a first sensor 127A is displayed on the wireless mobile device 129 for viewing by a user 410 of the wireless mobile device 129, and provides an example of the use of an installation map, displayed on the wireless mobile device 129, that provides information (such as situational factor data) specific to the user 410, which the user 410 can use to determine what action(s) and/or egress route(s) to take in response to the event 430. A situational icon, e.g., an "X" or other suitable graphic, is displayed on the map to represent the type and location of the detected event 430.

The server 109 determines the type and location of the event 430 based on sensor location data and/or situational factor data (including data in the sensor association module 335 and data output by the sensors 121, 123, and 127). As described above, the server 109 also knows the wireless mobile device's location, most recent direction of motion and/or or most recent orientation and, as previously described, may send map data of the proximate area to the wireless mobile device 129, together with sensor location data, sensor data, situational factor data, and/or orientation data. As a result, the wireless mobile device's visual display is oriented with respect to at least one of the wireless mobile device's location, most recent direction of movement and/or most recent orientation. Arrow 450 points from the wireless mobile device 129 to a view 460 of what the user 410 sees. Arrow 303 represents a wireless message transmitted from the server 109 to the wireless mobile device 129.

The view 460 depicts a sample front view of an exemplary wireless mobile device 129, which comprises, by way of example and not limitation, the display 201, input devices 209 (keypad and computer mouse), and optional camera 215, microphone 217 and speaker 219. On the display 201 is shown a map 480 of the area proximate the person's/wireless mobile device's location, oriented to the wireless mobile device's most recent direction of motion and/or the wireless mobile device's most recent orientation, as represented by arrow 301. The map 480 depicts the wireless mobile device's location 470 relative to a location of the detected event 430. Optionally the display 201 depicts a location, and/or identification of, an installation sensor 127.

The user 410 is depicted, in this non-limiting example, as standing in a passageway 499 and facing toward a wall 420. In a room 493 on the user's right but hidden by an adjacent wall 421 is the event 430—which for purposes of illustration only, may be a fire. In this example, a door 495 of the room 493 is open, allowing a hazard 440 (e.g., hazardous vapors) to form in a second, adjoining passageway 491. Depending on the type and severity of the hazard 440, the passageway 491 leading to exit point 492 may be rendered impassable. On the map, one or more situational icons is or are displayed that represent the location, type and/or status of the exit point 492. For example, a first situational icon (e.g., a starburst) may be used to represent the hazardous vapors 440. A second situational icon (e.g., dashed bolded line) representing the exit point 492 indicates that the exit point 492 is open, but not recommended for emergency egress. Although a first exit sensor (not shown) has outputted data to the sensor association module 335 (FIG. 3) indicating that the exit point 492 is unlocked, another sensor 127B has also outputted data to the sensor association module 335 indicating that the hazardous vapor 440 is present in the passageway 491. The data output by the sensor 127B can also indicate a type, concentration, and/or composition of the hazardous vapor 440. Combining these various types of data with other information in the sensor association module 335, the server 109 uses the sensor streaming module 345 to place the first and second situational icons on the map to indicate that exit point 492 should not be used, since the user 410 would be placed at unacceptable risk by having to pass proximate the open door 495, the hazardous vapor 440 and the detected event 430.

By way of further example, a third situational icon (e.g., a solid, bolded line) representing the exit point 496, which is located in an unobstructed passageway 490 opposite the blocked passageway 491, is placed on the map to indicate that the exit point 496 is locked or blocked. This determination is made because an exit sensor (not shown) associated with the exit point 496 has either not responded or has outputted data to the sensor association module 335 (FIG. 3) indicating that exit point 496 is locked or blocked. In this example, the sensor association module 335 is configured to interpret a non-response from an exit sensor as indicating that the exit point 496 is locked or blocked. Processing data from the sensor association module 335, the server 109 uses the sensor streaming module 345 (FIG. 3) to place the third situational icon on the map to indicate that exit point 492 should not be used for emergency egress.

A fourth situational icon (e.g., a solid, thin line) representing a third exit point 494, which is located in a passageway 497 between the passageways 491 and 490, is placed on the map to indicate that the exit point 494 is unlocked, accessible and/or operational. This determination is made based on data outputted from another exit sensor (not shown) associated with the exit point 494 to the sensor association module 335 (FIG. 3). Having determined using data from the sensor association module 335 (FIG. 3) that exit points 492 and 496 are not suitable for egress, the server 109, uses the sensor streaming module 345 (FIG. 3) to place a possible egress route 498, indicated by a fifth situational icon, (e.g., a dashed arrow that extends from the person's position 470 in passageway 499 toward the exit point 494) on the map. In FIG. 4, the person's position 470 is represented by a situational icon (e.g., an asterisk). The possible egress route 498 is computed centrally (e.g., by the server 109) for the specific user 410 or is computed locally by the wireless mobile device 129.

Additionally, in this example, the display of the wireless mobile device is configured to show instructions 482. The server 109 generates the instructions 482 using the data from the sensor association module 335 and uses the sensor streaming module 345 (FIG. 3) to display the instructions 482 on the map 480, which appears on the display of the wireless mobile device. The instructions 482 are conveyed from the server 109 to the wireless mobile device 129 via the wireless message 303. The instructions 482 indicate one or more of the following: a location of a blocked or impassable exit point; a location of an operational and accessible exit point; directions for proceeding along a possible egress route; indication of a type of detected event; instructions specific to the detected event, and so forth. The instructions 482 are text, video, or a combination thereof.

Optionally, in this example, the speaker 219 is configured to broadcast audio instructions 483. The server 109 is configured to generate the audio instructions 483 using the data from the sensor association module 335 (FIG. 3) and uses the sensor streaming module 345 (FIG. 3) to play the audio instructions 483 over the speaker 219 of the wireless mobile device. Alternatively, the audio instructions 483 can be live or pre-recorded voice instructions. Whatever the embodiment, the audio instructions 483 are configured to provide an audible description of an available exit location and/or an audible description of the possible egress route. Like the instructions 482, the audio instructions 483 indicate one or more of the following: a location of a blocked or impassable exit point; a location of an operational and accessible exit point; directions for proceeding along a possible egress path;

indication of a type of detected event; instructions specific to the detected event, and so forth.

In this, or an equivalent manner, the person 410 is informed of the detected event 430 and provided with information that allows him or her to determine how best to respond and/or egress.

In one embodiment, the installation is equipped with one or more emergency broadcast location beacons 412, each having an independent power supply. The wireless mobile device 129 is configured to receive one or more types of data broadcast from the beacons 412, and is configured to integrate the received data, which may include location data that can be used to determine a position, most recent direction of movement, and/or geographical orientation of the wireless mobile device 129, into the egress planning.

Methods

Figure 5:
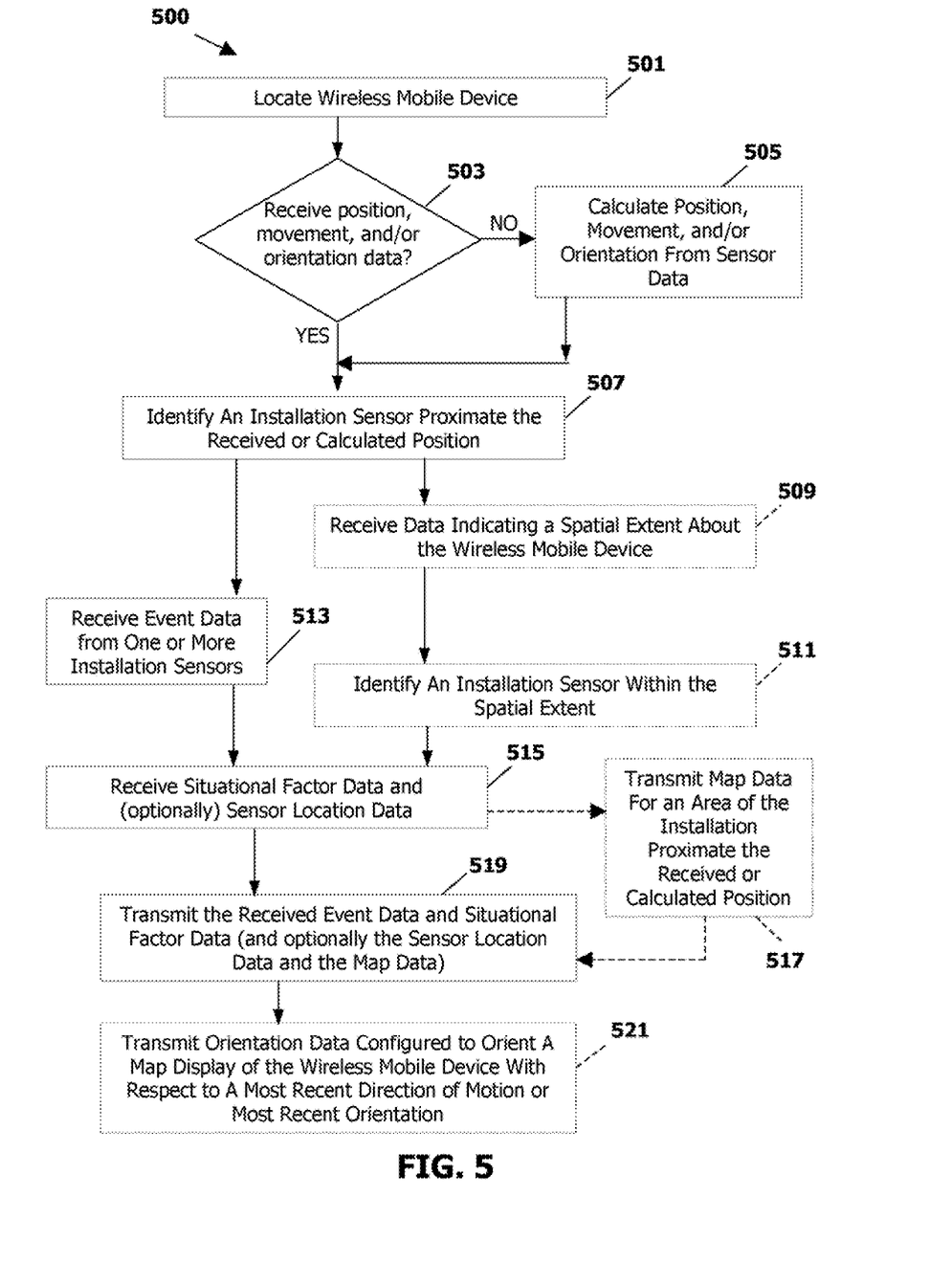
FIG. 5 is a flowchart illustrating an embodiment of a method for communicating with the wireless mobile device.

FIG. 5 is a flowchart illustrating an embodiment of a method 500 for communicating with the wireless mobile device 129 (FIGS. 1, 2, 3, and 4). Referring to FIGS. 1, 2, 3, 4, and 5, the method 500 begins by locating 501 the wireless mobile device 129. At decision block 503, the server 109 determines whether location data and orientation data has been received from the wireless mobile device 129. If no, the server 109 calculates 505 the wireless mobile device's location, most recent direction of movement, and/or most recent orientation from sensor data provided by at least one of (a) the one or more sensors 105 and (b) one or more components of the wireless mobile device 129, such as the processor, memory, transceiver, accelerometer, etc. If yes, the server 109 identifies 507 an installation sensor proximate the received or calculated position of the wireless mobile device 129. Optionally, identifying an installation sensor proximate the wireless mobile device's received or calculated position further comprises determining 509 a spatial extent 302 about the wireless mobile device 129. The size of the spatial extent 302 varies, but is selected as being appropriate for the wireless mobile device's location. In one embodiment, the spatial extent 302 has a radius that is configurable and adjustable by a user 410 of the wireless mobile device 129. Also optionally, identifying an installation sensor proximate the wireless mobile device's received or calculated position comprise identifying 511 one or more installation sensors within, or overlapped, by the spatial extent.

The method 500 further comprises receiving 513 event data indicative of a type and location of a detected event. The event data is received from the identified installation sensor and/or one or more other installation sensors that are not within the spatial extent of the wireless mobile device 129.

Proceeding from either block 513 or 511, the method 500 further comprises receiving 515 at least situational factor data and/or sensor location data for the identified installation sensor and/or the one or more other installation sensors. Optionally, the method 500 further comprises transmitting 517 map data for an area of the installation proximate a position of the wireless mobile device 129. Thereafter, the method 500 further comprises transmitting 519 the received event data, situational factor data and/or sensor location data to the wireless mobile device 129. The method 500 further comprises transmitting 521 orientation data to the wireless mobile device 129.

Referring to FIGS. 3, 4, and 5, the situational factor data is data from the sensor association module 335 that is indicative of one or more exit points 492, 494 and 496 and their operational status or accessibility. The situational factor data is also data indicative of a possible egress route 498. Thus, situational factor data can comprise data required to display one or more of the situational icons on the map 480 that appears on the display 201 of the wireless mobile device 129.

The orientation data is data, from the server 109, one or more of the installation sensors, and/or one or more components of the wireless mobile device 129 (such as one or more accelerometers onboard the wireless mobile device) that is configured to orient a map 480 on the display 201 of the wireless mobile device 129 with respect to the wireless mobile device's location, most recent direction of movement and/or most recent geographical orientation. The memory of the wireless mobile device 129 is operative to store at least one of the position data, situational factor data, sensor location data, sensor data, and/or orientation data.

Figure 6:
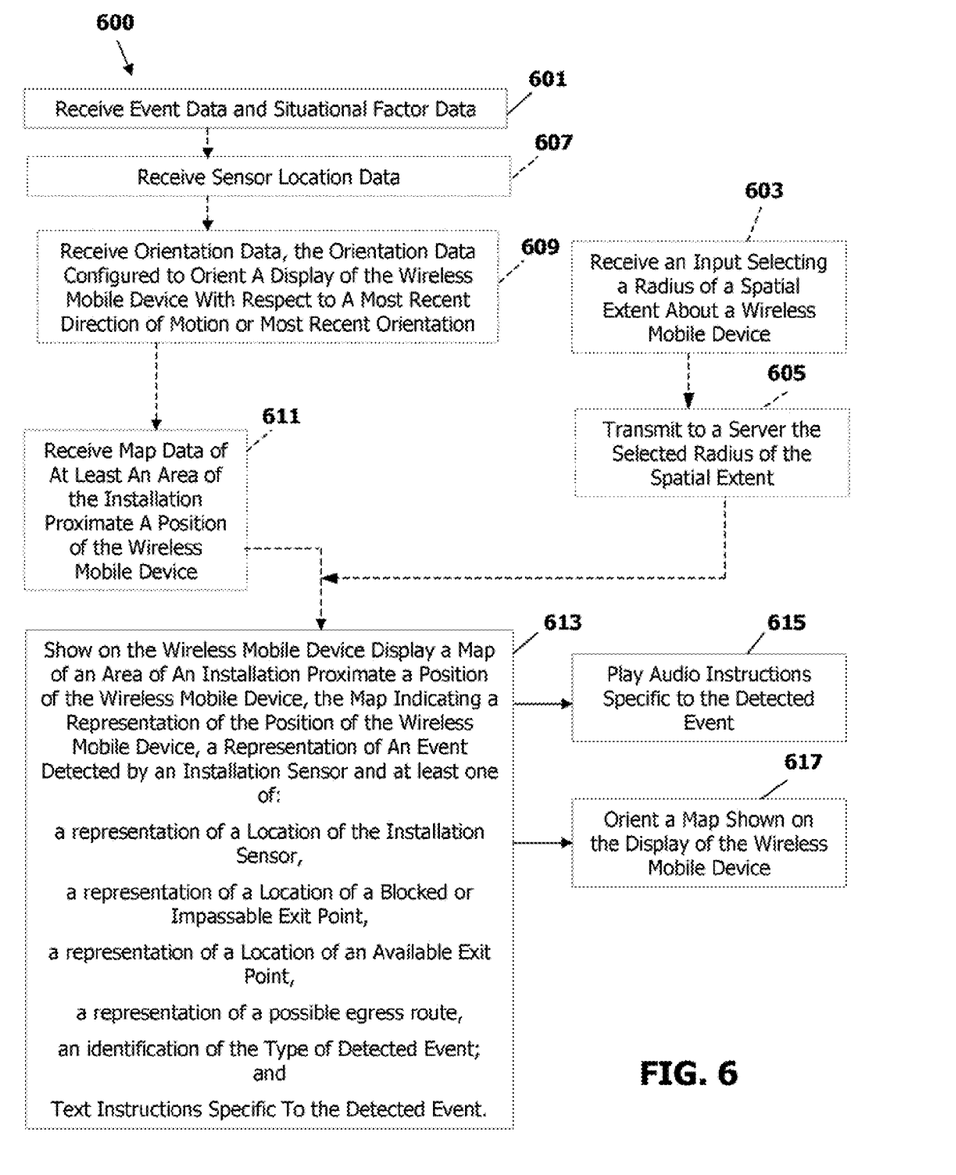
FIG. 6 is a flowchart illustrating an embodiment of a method for communicating with a system sensor via a fixed console.

FIG. 6 is a flowchart illustrating an embodiment of a method 600 for communicating with a system sensor 105 (FIG. 1) via a central console 101 (FIGS. 1, 3, 4). Referring to FIGS. 1, 2, 3, 4 and 6, one embodiment of the method 600 begins by the wireless mobile device 129 receiving 601 from the server 109 retrieved location data about an installation sensor 105 proximate the wireless mobile device 129, together with the situational factor data, sensor data and/or orientation data described above. Alternatively, the method 600 begins by the wireless mobile device 129 receiving 603 an input that selects a spatial extent 302 about the wireless mobile device 129. Thereafter, the method 600 optionally further comprises the wireless mobile device 129 transmitting 605 the selected spatial extent 302 to the server 109. Depending on the embodiment, either a radius or diameter of the spatial extent may be selected.

The method 600 further comprises receiving 607 location data about one or more installation sensors. One or more of the installation sensors may be within the spatial extent.

Optionally, the method 600 further comprises receiving 609 orientation data, the orientation data configured to orient a map shown on a display of the wireless mobile device with respect to the wireless mobile device's most recent direction of motion and/or most recent geographical orientation.

The method 600 further comprises receiving 611 map data representative of at least an area of the installation proximate a position of the wireless mobile device 129. Thereafter, the wireless mobile device 129 shows 613 on the wireless mobile device display 201 a map of an area of the installation proximate the position of the wireless mobile device, together with a representation of the position of the wireless mobile device 129 and a representation of an event detected by an installation sensor and at least one of: a representation of a location of the installation sensor, a representation of a location of a blocked or impassable exit point, a representation of an available (operational and accessible) exit point, a representation of a possible egress path, a representation of a type of detected event, and instructions (text or video) specific to the detected event. Optionally proceeding from step 609, the method 600 may further comprise playing 615 audio instructions specific to the detected event. As shown FIG. 4, the method 600 of FIG. 6 may further comprise orienting 617 the map shown on the display of the wireless handheld device with respect to the wireless mobile device's location, most recent direction of motion and/or most recent orientation.

Computer System

Referring again to FIGS. 1, 2, 3, 4, 5, 6, the functions or algorithms of the system 100, and components and subcomponents thereof, may be implemented in software or a combination of software and user-implemented procedures, and executed by machines comprising computer hardware and/or firmware. The software may comprise computer-executable instructions stored on computer readable media, and/or in computer-readable memory. "Computer readable media" comprises disks as well as carrier waves, which are any type of electromagnetic wave that can be modulated, either in frequency, amplitude or phase, to transmit the computer-executable instructions (e.g., software). The functions of wireless mobile device 129 and/or other components of the system 100 may be implemented by one or more software modules. This software and/or its modules can be executed at least by the server 109 and/or the wireless mobile device processor 203.

Unless indicated otherwise, the steps of the methods described herein may be performed serially, or in parallel, using multiple processors or a single processor configured as two or more virtual machines or sub-processors.

Figure 7:
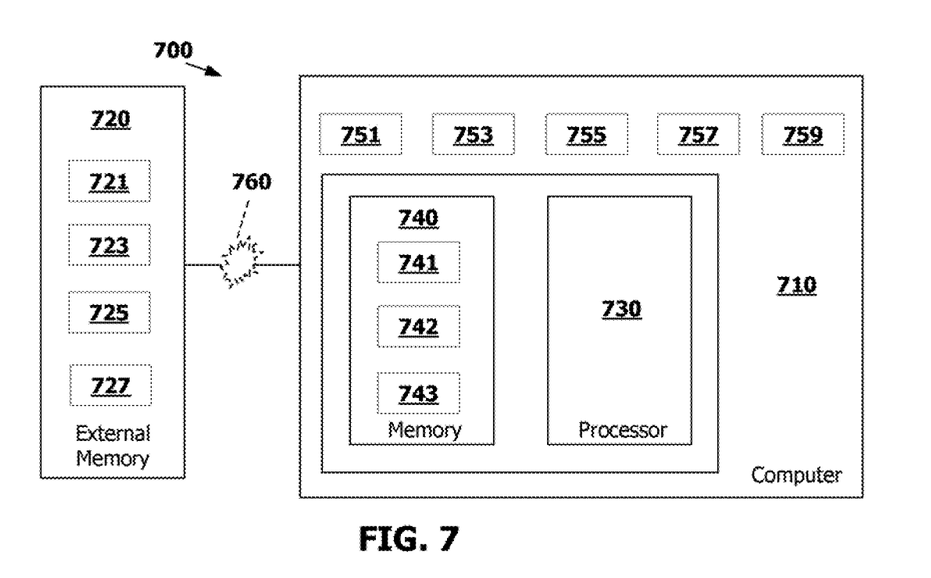
FIG. 7 is a block diagram of a computer system that may be used to implement software used by embodiments of the system and/or the mobile device.

FIG. 7 is a block diagram of a computer system 700 that may be used to implement software used by embodiments of the system 100 (FIG. 1) and/or the wireless mobile device 129 (FIGS. 1, 2, 3 and 4). The computer system 700 comprises a computer 710, and may optionally comprise external, or network, devices 720, such as the sensors 105, 121, 123, 127, 127A, 127B and the emergency beacon(s) 412. The computer 710 comprises a processor 730 coupled with a memory 740, which may comprise a volatile memory 741 and/or a non-volatile memory 742. A computer software program 743 may be stored in the memory 740 for execution by the processor 730. The computer 710 may further comprise a removable storage device 751 and/or a non-removable storage device 753. Via a wireless or wired communication channel, the computer 710 may have access to external volatile memory 721, external non-volatile memory 723, external removable storage device(s) 725, and/or external non-removable storage device(s) 727. Collectively, the internal storage devices 751, 753 and external storage devices 725, 727 are referred to as "computer storage", and may comprise one or more of the following: random access memory ("RAM"), read only memory ("ROM"), erasable programmable read-only memory ("ERPROM"), electrically erasable programmable read-only memory ("EEPROM"), flash memory or other kinds of computer memories, compact disc read-only memory ("CD ROM"), digital versatile discs ("DVD") or other kinds of optical disc-based storage, magnetic cassettes, magnetic tape, magnetic disc storage or other kinds of magnetic storage technologies, or any other medium configured to store computer-readable instructions.

The computer 710 may further comprise an input 757, an output 759, and a transceiver 755, comprising an encoder and/or decoder, for formatting and/or encrypting/decrypting wired or wireless signals transmitted from and/or to the computer 710 over a network 760, which may be either a local area network ("LAN") or a wide area network ("WAN"). As used herein, the term "computer" may comprise one of: a personal computer, a handheld computer, a server, a router, an access controller, a wireless security device, a network node, a peer device, a fixed security device, a central console, and the like.

Embodiments of the invention provide one or more technical effects. By way of example, and not limitation, one technical effect is the provision of a possible egress route for one or more persons on an installation in response to the detection and/or identification of the type and location of an event. Other technical effects include, but are not limited to: displaying a map on a display of a wireless mobile device, the map comprising: a representation of a type and/or location of a detected event, a representation of a position of the wireless mobile device, a representation of an available exit point and a representation of a possible egress route that avoids, or minimizes contact with, the detected event. The map may be of an area of the installation proximate a position of the wireless mobile device.

As used herein, an element or function recited in the singular and preceded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A handheld wireless mobile device, comprising:
 a memory storing computer-readable instructions;
 a display;
 an accelerometer; and
 a processor coupled with each of the memory and the display, wherein the processor is configured to execute the computer-readable instructions to perform a method, the method including:
  receiving, by the handheld wireless mobile device, event data corresponding to an event detected by one or more installation sensing devices located within an installation and external to the handheld wireless mobile device;
  receiving, by the handheld wireless mobile device, situational factor data corresponding to the detected event;
  determining a direction of movement of the handheld wireless mobile device based on input from the accelerometer;
  displaying, on the display, a map of at least a portion of the installation, the map being oriented to the direction of movement of the handheld wireless mobile device, and including a representation of the handheld mobile wireless device, a representation of the detected event, representations of the one or more installation sensing devices, and a representation of a possible egress route.

2. The handheld wireless mobile device of claim 1, wherein the method further includes:
 displaying, on the display, a representation of a location of an impassable, exit point;
 displaying, on the display, a representation of a location of an available exit point;
 displaying, on the display, identification of a type of detected event; and displaying, on the display, instructions specific to the detected event.

3. The handheld wireless mobile device of claim 1, wherein at least one of the one or more installation sensing devices is within a pre-defined spatial extent around the handheld wireless mobile device.

4. The handheld wireless mobile device of claim 1, further comprising:
a speaker coupled with the processor and configured to play audio instructions specific to the detected event.

5. The handheld wireless mobile device of claim 2, wherein the instructions specific to the detected event are one of text instructions and video instructions.

6. The handheld wireless mobile device of claim 1, further comprising:
a transceiver coupled with the processor and with the memory, wherein the transceiver is configured to receive the situational factor data from a server.

7. The handheld wireless mobile device of claim 6, wherein the situational factor data includes sensor data from a sensor association module of the server that is indicative of one or more exit points and their operational status or accessibility.

8. The handheld wireless mobile device of claim 6, wherein the situational factor data includes egress data indicative of the possible egress route.

9. The handheld wireless mobile device of claim 6, wherein the situational factor data includes icon data required to display one or more situational icons on the map that appears on the display of the wireless mobile device.

10. The handheld wireless mobile device of claim 6, wherein the memory is configured to store orientation data, wherein the orientation data includes server data from the server, sensor data corresponding to the one or more installation sensors, and component data corresponding to one or more components of the handheld wireless mobile device configured to orient the map on the display of the handheld wireless mobile device with respect to a position of the handheld wireless mobile device, a most recent direction of movement of the handheld wireless mobile device, or a most recent geographical orientation of the handheld wireless mobile device.

11. A computer-implemented method, comprising:
receiving, by a handheld mobile wireless device, event data corresponding to an event detected by one or more installation sensing devices located within an installation and external to the handheld wireless mobile device;
receiving, by the handheld mobile wireless device, situational factor data corresponding to the detected event;
determining a direction of movement of the handheld wireless mobile device based on input from an accelerometer included in the handheld wireless mobile device; and
displaying, on a display of the handheld mobile wireless device, a map of at least a portion of the installation, the map being oriented to the direction of movement of the handheld wireless mobile device, and including a representation of the handheld mobile wireless device, a representation of the detected event, representations of the one or more installation sensing devices, and a representation of a possible egress route.

12. The computer-implemented method of claim 11, further comprising:
receiving, by the handheld wireless mobile device, location data for the one or more installation sensors;
receiving, by the handheld wireless mobile device, orientation data configured to orient the map with respect to a most recent direction of motion of the handheld wireless mobile device or most recent geographical orientation of the handheld wireless mobile device.

13. The computer-implemented method of claim 11, further comprising:
receiving, by the handheld wireless mobile device, map data corresponding to an area of the installation proximate to a position of the handheld wireless mobile device.

14. The computer-implemented method of claim 11, further comprising:
receiving, by the handheld wireless mobile device, an input selecting a spatial extent about the handheld wireless mobile device; and
transmitting, from the handheld wireless mobile device, to a server the selected spatial extent.

15. The computer-implemented method of claim 11, further comprising:
playing, by the handheld wireless mobile device, audio instructions specific to the detected event.

16. The computer-implemented method of claim 11, further comprising:
orienting, by the handheld wireless mobile device, the map shown on the display with respect to a location of the handheld wireless mobile device, and most recent orientation of the handheld wireless mobile device.

17. The computer-implemented method of claim 11, further including:
displaying, on the display, a representation of a location of an impassable exit point;
displaying, on the display, a representation of a location of an available exit point;
displaying, on the display, identification of a type of detected event; and
displaying, on the display, instructions specific to the detected event.

18. The computer-implemented method of claim 17, wherein the instructions specific to the detected event are at least one of text instructions and video instructions.

19. A system, comprising:
one or more installation sensors configured to detect an event and to output sensor location data, situational factor data, and orientation data;
a handheld wireless mobile device operative to be in wireless communication with the one or more installation sensors; and
a server operative to be in wireless communication with the one or more installation sensors and the handheld wireless mobile device, wherein the server comprises:
a server memory storing server computer-readable instructions; and
a server processor coupled with the server memory, wherein the server processor is configured to execute the server computer-readable instructions to perform a server method, the server method including:
locating, by the server, the handheld wireless mobile device in an installation;
determining, by the server, whether location data, movement data corresponding to a most recent direction of movement of the handheld wireless mobile device, or orientation data corresponding to a most recent orientation of the handheld wireless mobile device has been received from the handheld wireless mobile device;
identifying, when the location data, the movement data or the orientation data are determined to have been received by the server, one or more installation sensing devices located within the installation and proximate to a position of the handheld wireless mobile device;

receiving, by the server, event data from the one or more installation sensing devices indicative of a type and a location of an event detected by the one or more installation sensing devices;

receiving, by the server, situational factor data from the one or more installation sensing devices; and transmitting the received event data and the situational factor data to the handheld wireless mobile device; and wherein the handheld wireless mobile device comprises:
a device memory storing device computer-readable instructions;
a display;
an on-board accelerometer; and
a device processor coupled with each of the device memory and the display, wherein the device processor is configured to execute the computer-readable instructions to perform a device method, the device method including:

receiving, by the handheld wireless mobile device, event data corresponding to an event detected by one or more installation sensing devices located within an installation and external to the handheld wireless mobile device;

receiving, by the handheld wireless mobile device, situational factor data corresponding to the detected event;

determining a direction of movement of the handheld wireless mobile device based on input from the on-board accelerometer;

displaying, on the display, a map of at least a portion of the installation, the map being oriented to the direction of movement of the handheld wireless mobile device, and including a representation of the handheld mobile wireless device, a representation of the detected event, representations of the one or more installation sensing devices, and a representation of a possible egress route.

* * * * *